United States Patent [19]
DeBona et al.

[11] 4,310,652
[45] Jan. 12, 1982

[54] MELT PROCESSABLE POLY(ESTER CARBONATE) WITH HIGH GLASS TRANSITION TEMPERATURE

[75] Inventors: Bruce T. DeBona, Madison; Dusan C. Prevorsek, Morris Township, Morris County, both of N.J.

[73] Assignee: Allied Chemical Corporation, Morristown, N.J.

[21] Appl. No.: 133,228

[22] Filed: Mar. 24, 1980

[51] Int. Cl.$^3$ ............................................. C08G 63/00
[52] U.S. Cl. ................................... 528/125; 528/128; 528/170; 528/176; 528/190; 528/193
[58] Field of Search ............... 528/125, 128, 170, 176, 528/190, 193

[56] References Cited

U.S. PATENT DOCUMENTS

| | | | |
|---|---|---|---|
| 3,036,036 | 5/1962 | Howe | 260/47 |
| 3,036,037 | 5/1962 | Howe | 260/47 |
| 3,036,039 | 5/1962 | Howe | 260/47 |
| 3,169,121 | 2/1965 | Goldberg | 260/47 |
| 4,078,999 | 3/1978 | Pannell | 210/22 C |
| 4,105,633 | 8/1978 | Swart et al. | 528/176 |
| 4,156,069 | 5/1979 | Prevorsek et al. | 528/182 |
| 4,167,536 | 9/1979 | Factor | 525/450 |

FOREIGN PATENT DOCUMENTS 1179400 1/1970 United Kingdom .

OTHER PUBLICATIONS

Morgan, *J. Polymer Sci.*, vol. 2, part A, 1964, pp. 437–459.
Christopher et al., *Polycarbonates*, Reinhold, NY, 1962, p. 164.

*Primary Examiner*—Maurice J. Welsh
*Attorney, Agent, or Firm*—Alan M. Doernberg; Gerhard H. Fuchs

[57] ABSTRACT

Poly(ester aromatic dihydric alcohol) polymers having carbonate moieties, aromatic or cycloaliphatic dicarboxylic acid moieties and carbonate moieties and having high glass transition temperatures (over 100° C.) and being melt processable. At least part of the aromatic dihydric alcohol moieties have the 4-carbon of each of two phenoxies covalently bonded to the same ring carbon of a carbocyclic or heterocyclic moiety. Representative poly(ester carbonates) are formed from bisphenol-A, phenolphthalein, terephthaloyl chloride and phosgene.

6 Claims, No Drawings

MELT PROCESSABLE POLY(ESTER CARBONATE) WITH HIGH GLASS TRANSITION TEMPERATURE

DESCRIPTION

BACKGROUND OF THE INVENTION

The present invention relates to poly(ester-carbonates) and especially to poly(ester carbonates) with at least a portion of the hydroxyl groups supplied by bisphenols with the 4-carbon of each phenol covalently bonded to the same ring carbon of a carbocyclic or heterocyclic moiety.

Polycarbonates of various bisphenols including phenolphthalein are known from U.S. Pat. Nos. 3,036,036, 3,036,037 and 3,036,039 all to Howe (May 22, 1962), U.S. Pat. No. 4,078,999 to Pannell (Mar. 14, 1978) and U.S. Pat. No. 4,167,536 to Factor (Sept. 11, 1979). Polyesters of phenolphthalein, including phenolphthalein terephthalate, are known from references including British Pat. No. 1,179,400 (Jan. 28, 1970) and U.S. Pat. No. 3,523,078 (Aug. 4, 1970) of V. V. Korshak et al. Phenolphthalein is a well-known compound used as a pH indicator and as a laxative component and is prepared from phenol and phthalic anhydride by condensation reaction analogous to the preparation of bisphenol-A from phenol and acetone.

Poly(ester carbonates) are a known class of polymers, being described for example in U.S. Pat. No. 3,169,121 to Goldberg (Feb. 9, 1965), U.S. Pat. No. 4,156,069 of Prevorsek et. al. (May 22, 1979) and in our copending, commonly assigned application entitled "Poly(estercarbonate) With High Glass Transition Temperature", Ser. No. 088,782, filed Oct. 29, 1979. These polymers are formed by a condensation of a bisphenol such as bisphenol-A, phosgene and a dicarboxylic acid or acid halide such as terephthalic chloride (also called terephthaloyl chloride), with the moles of bisphenol approximately equal to the combined moles of phosgene and acid or acid halide. As described in U.S. Pat. No. 4,156,069 the most desirable combination of properties—including melt processability, high glass transition temperature, high molecular weight as indicated by specific viscosities in the range of 0.5 to 1 and high Izod impact resistance—are achieved when the molar ratio of phosgene to acid chloride is near 1 (such as about 0.8:1 to 1.2:1) and where the distribution of polycarbonate and polyester linkages are relatively random, without the presence of large polyester and large polycarbonate blocks.

A different type of poly(ester carbonate) is described in U.S. Pat. No. 4,105,633 to Swart et al. (Aug. 8, 1978). It describes an alternating poly(ester carbonate) having aromatic moieties linked on one side by the acid-derived end of an ester linkage and on the other side by the alcohol-derived end of a carbonate linkage, such moieties being derived, for example, from 4-hydroxybenzoic acid. The poly(ester carbonates) of U.S. Pat. No. 4,156,069 have, by contrast, aromatic dicarboxylic acid-derived moieties (terephthaloyl) linked solely by the acid-derived ends of ester linkages, and also aromatic bisphenol-derived moieties (from bisphenol-A) linked, randomly, by either the alcohol-derived end of an ester linkage or the alcohol-derived end of a carbonate linkage. U.S. Pat. No. 4,105,633 also has aromatic bisphenol-derived moieties, but these are proportedly linked solely to the alcohol-derived end of an ester linkage.

While the poly(ester carbonates) described in U.S. Pat. No 4,156,069 have the desired combination of properties for many applications, for certain applications such as cookware, wire coatings, electrical parts and motor housings, dimensional stability above about 180° C., as evidenced by glass transition temperature higher than this figure, is desirable.

Poly(ester carbonates) are described in copending application Ser. No. 088,782 having glass transition temperature at least about 200° C. with a retention or at least minimal loss of other properties, especially as compared to the poly(ester carbonates) described in U.S. Pat. No. 4,156,069. These polymers have a disadvantage, however, of requiring the use of relatively expensive and difficult to prepare substituted tricyclic aromatic bisphenols. In general, they also require temperatures of 320° C. or higher for melt processing.

Accordingly it is an object of this invention to provide poly(ester carbonates) having a glass transition temperature higher than 180° C. with the retention or at least minimal loss of other properties, compared to the poly(ester carbonates) described in U.S. Pat. No. 4,156,069, with melt processability significantly below the decomposition temperature of the polymer and, preferably, without the use of expensive or hard to prepare monomers.

BRIEF DESCRIPTION OF THE INVENTION

The present invention includes an improved poly(ester carbonate) consisting essentially of about equimolar amounts of moieties derived from aromatic diols and a combination of carbonate moieties and aromatic or cycloaliphatic diacyl moieties, with at least about 5 mol percent of the moieties derived from aromatic diols being a bisphenoxy moiety having the 4-carbon of each phenoxy covalently bonded to the same ring carbon of a carbocyclic or heterocyclic moiety, said carbocyclic or heterocyclic moiety having 5 to 14 cyclic atoms in 1 to 3 rings and being inert under polymerization reaction conditions. A preferred moiety derived from aromatic diol is that derived from phenolphthalein, which is preferably present as about 5 to about 35 mol percent of the moiety derived from aromatic diol, with the remainder of the moieties derived from aromatic diol preferably being those derived from bisphenol-A.

DETAILED DESCRIPTION OF THE INVENTION

The poly(ester carbonates) of the present invention are formed by the condensation of a bisphenol, phosgene and an acid or acid halide. The relative ratio of phosgene to acid or acid halide is not critical in the present invention, but may vary between about 10:1 and about 1:10, depending on the desired properties. In general, when attempting to achieve high glass transition temperatures, it is preferred that the acid or acid halide be at least approximately equimolar with phosgene such that the ester to carbonate ratio is at least about 0.8:1 and is preferably between about 1:1 and about 1.3:1.

Aromatic, monocyclic dicarboxylic acids and acid halides suitable for the present invention include those of the formula (1):

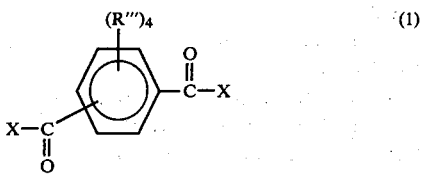

(1)

where X is hydroxyl, Cl or Br and R''' is independently at each occurrence H, Cl, Br, alkyl of 1-6 carbons, phenyl alkoxy of 1-6 carbons or phenoxy. Suitable cycloaliphatic dicarboxylic acids and acid halides are of the formula (2):

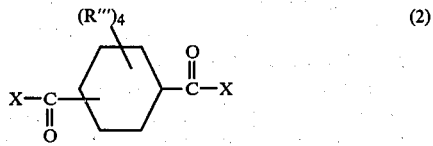

(2)

where X and R''' are as described above. Other suitable acids and acid halides are of the formula (3):

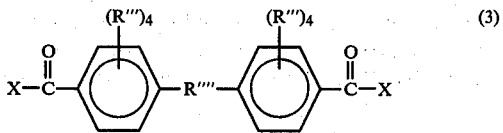

(3)

where X and R''' are as described above and R'''' is —CO—, alkylene of 1-6 carbons, —O—, —S— or a single bond; and of the formula (4):

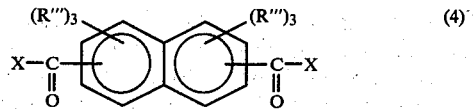

(4)

where X and R''' are as described above. In the cases illustrated by formulas (1) and (2), the acid or acid halide groups are 1,3 (meta) or 1,4 (para), and are preferably 1,4 (para). In the case described by formula (3), the acids or acid halides are meta or para to the linking group R'''' that is the 3,3'-, 3,4'- and 4,4'-isomers, and preferably both para as in the 4,4' isomer. In the case described by formula (4), the acid or acid halide groups are either 2,6 or 2,7. In all cases, the unsubstituted forms wherein R''' is hydrogen in all occurrences is preferred. In all cases the acid halides where X is Cl or Br, and especially Cl, is preferred. Thus, this monomer is preferably one or more of terephthalic chloride or bromide, isophthalic chloride or bromide, 1,4-cyclohexanedicarboxylic acid chloride or bromide, 1,3-cyclohexanedicarboxylic acid chloride or bromide, 3,3'-, or 3,4' or 4,4'-benzophenone dicarboxylic acid chloride or bromide, 2,6-naphthalene dicarboxylic acid chloride or bromide and 2,7-naphthalene dicarboxylic acid chloride or bromide. More preferred in each case are the acid chlorides.

Based upon the use of the above-preferred acid halide monomers, it will be appreciated that the preferred aromatic and cycloaliphatic diacyl moieties are terephthaloyl, isophthaloyl, 1,4-cyclohexanedicarboxyl, 1,3-cyclohexanedicarboxyl, 3,3'- or 3,4'- or 4,4'-benzophenone dicarboxyl, 2,6-naphthalene dicarboxyl and 2,7-naphthalene dicarboxyl. Terephthaloyl, isophthaloyl and mixtures thereof are especially preferred.

The present invention contemplates that at least 5 percent of the moieties derived from aromatic diols are bisphenoxies having the 4-carbon of each phenoxy covalently bonded to the same ring carbon of a carbocyclic moiety. Such bisphenols can be prepared by a method analogous to the preparation of phenolphthalein from phenol and phthalic anhydride as follows:

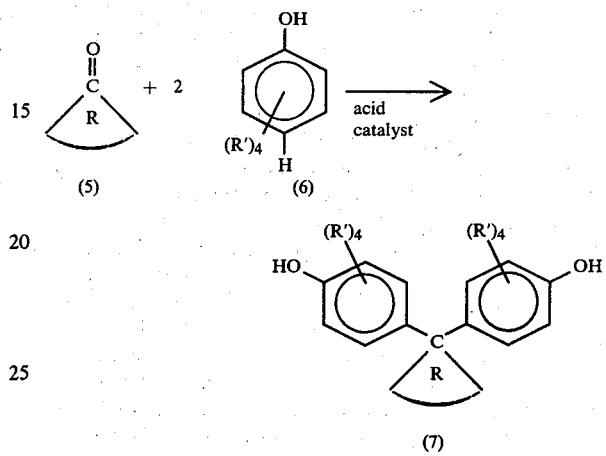

In the above formula (7), the moiety including the carbon covalently bonded to the 4-carbons of each phenols forms a part of a carbocyclic or heterocyclic structure indicated generally by R. This moiety may have 5 to 14 cyclic atoms in 1 to 3 rings. The rings may be saturated or unsaturated and, except for the ring containing the common carbon, may also be aromatic. Examples of such carbocyclic or heterocyclic moieties include those derived from cyclic ketones including cyclopentanone, cyclohexanone, cycloheptanone, indanone, tetralone, norboranone, coumaranone, anthrone, anthraquinone, and xanthone; lactams and lactones such as caprolactam and caprolactone; anhydrides such as phthalide; cyclic amides such as phthalimide and other carbonyl-containing heterocylics such as sulfobenzoic acid cyclic anhydride.

Preferred bisphenols used to prepare the bisphenoxy moieties are those derived from the condensation of phenol with a carbonyl-containing compound selected from the group consisting of phthalic anhydride, cyclohexanone, fluorenone, indanone, tetralone and mixtures thereof. A significant criteria for selecting suitable carbocyclic or heterocyclic moieties is that the moieties should be substantially inert under polymerization conditions. It should be understood, however, that groups susceptible to ring opening under harsh conditions, such as strong acid or base, may be used since such ring opening does not occur in at least one conventional polycarbonate or polyester forming condensation reaction. Thus, for example, the carbonyl represented by the first formula may be part of an anhyride, a lactam, a lactone, a sulfonate ester or the like. All of these groups, while themselves susceptible to ring opening, are inert during both the condensation reaction with phenol shown above and (in the condensed form) in the subsequent polymerization reaction. Thus, for example, phthalic anhydride has the central carbon as part of an anhydride group prior to condensation with phenol to form phenolphthalein and as part of an ester or lactone group after the condensation. Once polymerization is completed, however, the phenol oxygens are tied up in carbonate or ester linkages and, therefore, the phenolphthalein moiety is inert to the color-changing reaction with strong base characteristic of phenolphthalein as pH indicator. Similarly, other groups susceptible to ring opening may also be present since, in the final polymer, they are relatively protected from ring-opening conditions. It must be remembered that the final polymer contains carbonate linkages which are, in general, more susceptible to decomposition than is the heterocyclic moiety.

Either the heterocyclic moiety or the phenols may contain various substituents. Thus, for example, each phenol may be substituted by 1 to 4 R' groups such as chloro, fluoro, bromo, iodo, alkyl, alkoxy, phenyl or phenoxy. Similarly, the carbocyclic or heterocyclic moiety may be substituted by a variety of moieties including chloro, fluoro, bromo, iodo, alkyl, alkoxy, phenyl, phenoxy, amino and oxy (especially on ring atoms other than carbon). It is preferred, however, that the phenols be unsubstituted (i.e. R' being H in all occurrences). It is also preferred that the carbocyclic or heterocyclic moiety have only relatively small substituents, if any, on the cyclic atoms.

While most of the monomers of formula (7), and especially those prepared from cyclic ketones of formula (5), may be prepared from the corresponding compounds of formulas (5) and (6) by the above condensation reaction, other processes may be used. For some materials, especially where the "R" moiety is a heterocyclic compound such as a lactam or lactone, other techniques may be required. Representative methods are described in references such as P. W. Morgan, *J. Polymer Science,* Part A, Vol. 2, pp. 437–59 (1964), with other suitable preparative techniques being known within the art. Representative condensations of the type described in formulae (5), (6) and (7) are described in W. F. Christopher et al., *Polycarbonates* p. 161 (Reinhold Pub. Corp. 1962).

It is believed that the function of the carbocyclic or heterocyclic moiety shown in above formula (7) is both to stiffen the bending motion between the two phenoxies and to prevent regular or crystalline packing of adjacent polymer chains. For this first effect, the environment of the second carbon is particularly critical, and, thus, may depend upon whether the ring in which the central carbon is contained is a 5-member, 6-member or larger ring. The second effect is controlled largely by the size and polarity of the entire carbocyclic or heterocyclic moiety, including both ring atoms and substituents on the ring atoms. It is not entirely understood how these two factors interact in providing the advantageous properties of the present poly(ester-carbonates) as compared to those in U.S. Pat. No. 4,156,069.

For the present compositions, it is desirable that at least about 5 percent of the bisphenoxy moieties be of the type described above having such a carbocyclic or heterocyclic moiety including the central carbon. Depending upon the size of the carbocylic or heterocyclic moiety and the rigidity of bonds on the central carbon, the practicable upper limit of such moiety may vary. Thus, for example, with phenolphthalein, while increasing amounts of moieties derived from phenolphthalein continued to provide increased glass transition temperatures, levels of above about 35 percent lead to poly(ester carbonates) with excessively high melt viscosities, and thus limited melt processability. With smaller or less rigid carbocyclic or heterocyclic moieties, levels higher than about 35 percent may be suitable. Thus, for example, it is expected that moieties derived from cyclohexanone may be present at levels significantly higher than 35 percent of the total moieties derived from aromatic diols without loss of melt processability. By contrast, moieties derived from fluorenone are expected to show increased melt viscosities and thus limited melt processability at levels somewhat less than 35 percent of the total moieties derived from aromatic diols. Where the moieties derived from the bisphenol of formula (7) are only part of the total bisphenol-derived moieties, it is desirable that the remaining moieties be largely bisphenoxies which have more flexible bending motion between the phenoxies. The preferred moiety derived from aromatic diol for the remainder of the diol-derived moieties is that derived from bisphenol-A. Other aromatic diols, such as for example hydroquinone, resorcinol, bis(4-hydroxyphenyl)sulfone and bis(4-hydroxyphenyl)sulfide may be used instead of, or preferably in addition to, bisphenol-A in providing the moieties derived from aromatic diol.

In general, the poly(ester carbonates) of the present invention may be prepared by conventional processes, including solution and interfacial condensations. Examples 1–8 and 12, below, illustrate solution processes. In interfacial processes, the bisphenols are introduced as aqueous bisphenolate salt solutions such as alkali metal bisphenolate (e.g. the disodium salts of bisphenol-A and of phenolphthalein). By analogy to Comparative Example 11, some of the bisphenol may be introduced as such in a solution condensation to form oligomers, and the oligomers may be reacted by interfacial polymerization with the remaining bisphenol as aqueous bisphenolates. Phosgene may be introduced into the first step so as to form part of the oligomers, into the second step, or both. Because of the color formation of phenolphthalein in aqueous base, it may be desirable to introduce all of the phenolphthalein in the first, solution condensation step and wash the oligomers free of unreacted phenolphthalein before commencing the second, interfacial polymerization step.

In determining the advantageous properties of the polymers of the present invention it is desirable to obtain a decomposition temperature by techniques such as thermal gravimetric analysis (TGA). Other techniques, such as differential scanning calorimetry (DSC), may be used to determine the glass transition temperature (Tg) or the closely related softening point. It is also desirable to determine the viscosity of the polymer under two conditions: first in a solution of such solvents as dichloroethane, dichloromethane, and phenol/tetrachloroethane and second in the melt. In general, the solution viscosity is an indication of molecular weight, with the precise correlation between solution viscosity and molecular weight being described generally in F. W. Billmeyer, Jr., *Textbook of Polymer Science,* pp. 79–83 (J. Wiley & Sons, 1962), but sometimes requiring more precise correlations for particular combinations of monomers. The melt viscosity, on the other hand, is evidence of processability. It is desirable, for example, to first perform TGA and then to select a temperature reasonably below the decomposition temperature (e.g. 20°–40° C. below the decomposition temperature) and then determine the melt viscosity or melt index of the polymer at such temperature. Such analysis is exemplified by Example 12 below. It is also desirable to obtain physical properties of the polymer by molding it into various test samples and performing various standard tests such as Izod impact strength (by ASTM D256-73A), yield elongation (YE), tensile strength, yield strength and modulus (following the conditions of ASTM D 638, condition 5, for example) and haze indices and yellowness indices by the spectrophotometric methods described in U.S. Pat. No. 4,156,069, including ASTM D-1925. It is also desirable to retest these properties, and especially Izod impact strength, after heat aging.

Chemical analysis of the polymer may be performed by nuclear magnetic resonance (NMR) to determine ratios of carbonate to ester linkages and ratios of various bisphenols one to the other. Elemental analysis may be performed as a check upon monomer proportions introduced into the polymer. The distribution, particularly of polyester versus polycarbonate blocks, may be determined by high pressure liquid chromatography, as described, for example, in U.S. Pat. No. 4,156,069.

EXAMPLE 1

Poly(ester carbonate) having 80% BPA and 20% Phpth

Bisphenol-A (57.08 g, 0.25 mol), distilled pyridine (72.5 mL, 0.9 mol) and 600 mL of distilled dichloromethane (DCM) were charged to a 2 L 3-necked flask equipped for mechanical stirring. After 10 minutes of stirring, terephthalic chloride (TPC) (30.5 g, 0.15 mol) in 300 mL of DCM was added. After 20 minutes of further stirring, phenolphthalein (Phpth) (15.92 g, 0.05 mol) was added. Phosgene was then added over 1–2 hours with additional DCM (about 400 to 500 mL) added when the mixture became cloudy and too viscous for proper stirring. Stirring was stopped and the entire mixture was added to 8 L of isopropanol with stirring. The polymer was filtered from the liquid and washed in 8 L water initially at 60° C. overnight. The next morning, the water was reheated to about 45°–50° C.; the polymer was then filtered and dried on the filtration funnel for about 7 h. It was then dried in a 120° C. vacuum oven for about 40 h and then weighed as 165 g crude polymer. The crude polymer was purified by redissolving in DCM as a 10 percent solution by weight, filtered, precipitated in isopropanol, washed with 3.5 L of 80° C. water, filtered and dried for several days under ambient conditions and in a 120° C. vacuum oven for about 24 h.

The specific viscosity, Tg, molar ratios of bisphenol-A to phenolphthalein and of carbonate to ester linkages were determined by DSC, NMR, infrared analysis and elemental analysis. The results are displayed in Table I. Mechanical testing of this material is described in Example 9.

EXAMPLE 2

Poly(ester carbonate) having 80% BPA and 20% Phpth

Example 1 was repeated except for the order of addition by charging first bisphenol-A (57.08 g, 0.25 mol), phenolphthalein (15.92 g, 0.05 mol), distilled pyridine (72.5 mL, 0.9 mol) and distilled DCM (600 L). After 10 minutes of stirring, TPC (30.5 g, 0.15 mol) in 600 mL DCM was filtered and then added to the flask. Phosgene was added and, after 55 minutes, clouding was observed, and the viscosity began to increase. Over the next 30 minutes, the viscosity increased steadily until an extremely viscous mixture was present, at which point agitation was stopped. Methanol was added to esterify excess phosgene, and DCM was then added for dilution.

The polymer was then precipitated in 8 L of 30 isopropanol, filtered and soaked in warm water overnight. The water was reheated to 80° C.; the polymer was filtered and dried on the funnel in the air, and then for 3 h in a 120° C. vacuum oven. The crude polymer was dissolved at a level of 10 percent by weight in DCM, reprecipitated in about 8 L acetone, filtered and dried in a funnel to yield 90.7 g. It was then redissolved in DCM and reprecipitated in 5 L acetone allowing an hour of mixing in the acetone to try to produce a granular precipitate. After drying on the funnel, washing with 80° C. water, filtering and drying in air, the polymer was dried in the 120° C. vacuum oven for 72 h.

The product was tested in a similar manner to the product of Example 1 with the results shown in Table I. Mechanical testing of this material is described in Example 9.

EXAMPLE 3

Poly(ester carbonate) having 70% BPA and 30% Phpth

Example 2 was repeated using less bisphenol-A (47.9 g, 0.21 mol) and more phenolphthalein (26.6 g, 0.09 mol). An increase in viscosity was observed 50 minutes after phosgene addition and the reaction was stopped after 10 more minutes. The product was diluted with DCM for handling, precipitated in 6 L isopropanol, filtered, washed in warm water, filtered, dried in air and in 120° C. vacuum oven, redissolved in DCM and precipitated in 6 L acetone. It was then again filtered, washed in warm water, filtered and dried in air and in the vacuum oven.

The product was tested in a similar manner to the product of Example 1 with the results shown in Table I. Mechanical testing of this material is described in Example 9.

EXAMPLE 4

Poly(ester carbonate) having 83% BPA and 17% Phpth

Into a 5 L 3-necked flask, distilled pyridine (116 mL, 1.44 mol) and distilled DCM (960 mL) were charged, followed by bisphenol-A (91.33 g, 0.40 mol). After a nitrogen sweep, previously filtered TPC (40.6 g, 0.20 mol) in DCM (400 mL) was added. After 15 minutes more mixing, p-tert-butylphenol (2.23 g, 3.5 mol percent of total bisphenol) was added as a powder. After 10 minutes more mixing, phosgene addition was started and phenolphthalein (25.47 g, 0.08 mol) was added as a powder. After 2 h, reaction appeared complete, with a sample of the reaction mixture not turning 5 percent sodium hydroxide pink: evidencing complete phenolphthalein reaction. Phosgene addition was continued, however, for 30 minutes more before stopping stirring, adding methanol and then sweeping with nitrogen.

The mixture was filtered, precipitated in 7.5 L isopropanol, washed in 80° C. water and dried (at ambient and then in a vacuum oven) to produce a crude yield of 134.6 g. The product was redissolved in DCM and precipitated in acetone to produce a rubbery, hard and chunky solid. It was redissolved in DCM, precipitated in isopropanol, washed in 80° C. water and dried to yield 118.0 g of product.

The product was tested in a similar manner to the product of Example 1 with the results shown in Table I.

Mechanical testing of this material is described in Example 9.

EXAMPLE 5

Poly(ester carbonate) containing 80% BPA and 20% Phpth

Example 4 was repeated charging the following four materials:

| | | | |
|---|---|---|---|
| (a) | bisphenol-A | 73.06 g | 0.32 mol |
| | pyridine | 94.9 mL | 1.2 mol |
| | DCM | 950 mL | |
| (b) | TPC | 40.62 g | 0.20 mol |
| | DCM | 450 mL | |
| (c) | p-tert-butylphenol | 2.22 g | |
| | DCM | 20 mL | |
| (d) | phenolphthalein | 25.40 g | 0.08 mol. |

There was no substantial wait before adding (c) and (d), and stirring was continued during and after the addition of these materials. Ten minutes later, phosgene addition was started at a rate about 0.2 g/min. The reaction took 115 minutes and the product was filtered and precipitated in 8 L isopropanol, washed in 80° C. water, vacuum dried, redissolved in DCM, reprecipitated in isopropanol, washed in 80° C. water and vacuum dried. The yield was 109.0 g.

The product was tested in a similar manner to the product of Example 1 with the results shown in Table I. Mechanical testing of this material is described in Example 9.

EXAMPLE 6

Poly(ester carbonate) having 85% BPA and 15% Phpth

To the 5 L 3-necked flask the following four materials were added with mixing:

| | | | |
|---|---|---|---|
| (a) | bisphenol-A | 77.63 g | 0.34 mol |
| | pyridine | 94.9 mL | 1.20 mol |
| | DCM | 950 mL | |
| (b) | TPC | 40.6 g | 0.20 mol |
| | DCM | 450 mL | |
| (c) | p-tert-butylphenol | 2.22 g | |
| | DCM | 20 mL | |
| (d) | phenolphthalein | 19.1 g | 0.06 mol |

Components (c) and (d) were added 10 minutes after component (b). Phosgene was added over 120 minutes at a rate of about 0.2 g/min. Methanol was then added to excess phosgene and the mixture was swept with nitrogen. The mixture was filtered, precipitated in isopropanol, filtered, soaked in cold water and washed in 80° C. water, filtered, dried and vacuum dried. The 195 g crude product was purified by reprecipitation from a 10% solution in DCM into isopropanol, dried, washed in 80° C. water and vacuum dried. The final yield was 120 g.

The product was tested in a similar manner to the product of Example 1 with the results shown in Table I. Mechanical testing of this material is described in Example 9.

EXAMPLE 7

Poly(ester-carbonate) containing 80% BPA and 20% Phpth

Example 5 was repeated except that another, apparently purer TPC reagent was used. The yield was 122 g.

The product was tested in a similar manner to the product of Example 1 with the results shown in Table I. Mechanical testing of this material is described in Example 9.

EXAMPLE 8

Poly(ester-carbonate) containing 85% BPA and 15% Phpth

Example 6 was repeated except the following quantities were used for the four materials:

| | | | |
|---|---|---|---|
| (a) | bisphenol-A | 228.3 g | 1.0 mol |
| | pyridine | 280 mL | 3.5 mol |
| | DCM | 2825 mL | |
| (b) | TPC | 119.6 g | 0.59 mol |
| | DCM | 1200 mL | |
| (c) | p-tert-butylphenol | 2.79 g | |
| | DCM | 50 mL | |
| (d) | phenolphthalein | 56.3 g | 0.18 mol |
| | pyridine | 140 mL | 1.8 mol |

The techniques of preparation and polymer isolation and purification were as described above in Example 6.

The product was tested in a similar manner to the product of Example 1 with the results shown in Table I. Mechanical testing of this material is described in Example 9.

TABLE I

| Example | % Phpth Monomer | Spec. Visc. | Tg by DSC | NMR BPA/Phpth |
|---|---|---|---|---|
| 1 | 20 | 1.83 | 212° C. | 81%/19% |
| 2 | 20 | 2.47 | 219° C. | 75%/25% |
| 3 | 30 | 2.01 | 234° C. | 68%/32% |
| 4 | 17 | 0.82 | 188° C. | 82%/18% |
| 5 | 20 | 0.53* | 195° C. | 80%/20% |
| 6 | 15 | 0.72 | 200° C. | 78%/22% |
| 7 | 20 | 0.70 | 205° C. | 78%/22% |
| 8 | 15 | 1.3 | 208° C. | — |
| C10 | 0 | 0.7** | 185° C. | — |
| C11 | 0 | 0.99 | 200° C. | — |

*in DCM; value was 0.65 in 60/40 phenol-tetrachloroethane
**in 60/40 phenol-tetrachloroethane

TABLE II

| Example | % Phpth Monomer | Spec. Visc. | Therm. Decomp. by TGA | Izod Impact Strength |
|---|---|---|---|---|
| 1 | 20 | 1.83 | >400 | 3.5 |
| 2 | 20 | 2.47 | >400 | 3.8 |
| 3 | 30 | 2.01 | >400 | 3.0 |
| 4 | 17 | 0.82 | >400 | 4.0 |
| 5 | 20 | 0.53* | NM | 4.3 |
| 6 | 15 | 0.72 | >400 | 5.0 |
| 7 | 20 | 0.70 | >400 | 3.6 |
| 8 | 15 | 1.3 | >400 | 5–5.2 |
| C10 | 0 | 0.7** | >400 | 5–7 |
| C11 | 0 | 0.99 | >400 | 1–2 |

*in DCM; value was 0.65 in phenol-trichloroethylene.
NM = not measured

EXAMPLE 9

Mechanical Testing

Samples of polymer from each of Examples 1–8 were tested by TGA for decomposition temperature. In each case significant weight loss occurred at a fairly well-defined temperature and continued rapidly with increasing temperature. Table II shows the approximate temperature where one percent weight loss had occurred. Test samples were then molded at 320° C. and 550 Pa (80 pounds per square inch) and tested for Izod impact strength in the method of ASTM D 256-73A. The results are also displayed in Table II.

Material prepared in Example 8 and molded at 320° C. was also heat aged for periods of 72 h and 168 h in an oven at 120° C. or 160° C. When these molded materials were taken out, allowed to cool and tested for Izod and impact strength, values between 4.8 and 5.2 continued to be observed. This compares with the known deterioration of Izod impact strength for polycarbonates.

COMPARATIVE EXAMPLE 10

Poly(ester carbonate) prepared with 100% BPA

Into a 12 liter 3-neck flask equipped with a mechanical stirrer, gas inlet fitting, dry-ice condenser, gas exit traps (aqueous KOH) and water bath at 25° was placed 685 g (3 moles) of pure bisphenol-A. Anhydrous pyridine (725 mL, 9 moles) was added, after which the stirrer was started and air purged from the reaction flask with dry nitrogen gas. After complete dissolution of the bisphenol, anhydrous dichloromethane (6 L) was added with continued stirring and nitrogen gas flow. A solution of pure terephthaloyl chloride (305 g, 1.5 moles) in dichloromethane (3 L) was then prepared and filtered as rapidly as possible to remove any insoluble matter. This acid chloride solution was added in a single stream over several seconds time with thorough stirring to the bisphenol solution. After ten minutes a solution of p-t-butylphenol (16.7 g, 3.5 mol % based on bisphenol) in dichloromethane (150 mL) was added to the contents of the reaction flask. At this point dry-ice and acetone were added to the condenser, nitrogen flow discontinued and the gas inlet fitting connected to a phosgene tank equipped with a gas flowmeter. Phosgene gas was then blanketed into the reaction flask at a rate of about 225 mL/min. which corresponds to about 1 g/min. (Thorough stirring is required in order to dissolve the phosgene as rapidly as it enters.) Addition time for the theoretical 1.5 moles of phosgene was about 2.5 hours during which time the viscosity of the solution increased and pyridinium hydrochloride precipitated as small granular crystals. Theoretical addition of phosgene was assured when by visual observation the viscosity of the solution no longer increased as phosgene addition was continued. Nitrogen gas flow was then restarted to purge the vapor space of gaseous phosgene; and the slight excess of phosgene in solution was destroyed (esterified) by careful addition of methanol (100 mL) in small portions. The polymer solution was then filtered through a coarse sintered glass funnel to remove most of the pyridinium hydrochloride (some of which remains dissolved in the filtrate). The filtered polymer solution was precipitated into 20 L of acetone with vigorous high shear agitation. (For best results the polymer solution should be added as a continuous stream over about one hour.) After precipitation, stirring was continued for at least one hour more so that the polymer granules would attain adequate hardness in order not to agglomerate when stirring was stopped. The polymer granules were allowed to settle whereupon the supernatant liquid was siphoned and discarded. The polymer was washed on a filter funnel with acetone and then stirred with water (4 L) at 70°-80° C. for one-half hour to extract pyridinium hydrochloride. The polymer was filtered, washed with acetone and dried on the filter funnel overnight. The polymer was further purified after dissolution in dichloromethane (10% solution by wt.; about 8 L) by reprecipitation and washing as described above at least once more, and finally dried at 110° C. in a vacuum oven at 133 Pa (1 torr) for 24 hours. The final yield (two precipitations) of pure white polymer was about 600 g. The material had a reduced viscosity of 0.7 dL/g at 25° C. in 60/40 wt. phenol/sym-tetrachloroethane. The ratio of bisphenol to terephthalate moieties in the polymer was 2:1 as determined by infrared absorbance ratios of carbonate and ester bands. The glass transition temperature, $T_g$, of the polymer was 185° C. by DSC.

COMPARATIVE EXAMPLE 11

Poly(ester-carbonate) prepared with 40% BPA and 60% TMDCB

Tetramethyldicumylbisphenol (TMDCB) (50 g, 0.124 mole) and bisphenol-A (12.1 g, 0.053 mole) were dissolved in a mixture of distilled dichloromethane (354 mL) and anhydrous pyridine (49.9 mL, 0.62 mole) under nitrogen. A solution of terephthaloyl chloride (21 g, 0.1035 mole) in dichloromethane (295 mL) was then added rapidly at 25° C. with stirring. The homogeneous solution was washed twice with 200 mL of 5% aqueous HCl and then water until neutral. The composition of the oligomer in terms of relative mole % bisphenols was at this point 70 mole % TMDCB, 30 mole % BPA.

The above oligomer solution was stirred at 300 rev/min with a solution comprised of deoxygenation distilled water (1033 mL), sodium hydroxide (33.1 g, 0.83 mole), triethylamine (1.48 mL, 0.0103 mole) and bisphenol-A (6.85 g, 0.03 mole). After 15 minutes of phosgene addition, a solution of p-t-butyl phenol (0.233 g, 0.75 mole) in dichloromethane (5 mL) was added. Phosgenation was continued for 60 minutes at which time the pH had reached 6. Aqueous sodium hydroxide (16 g, 0.4 mole in 50 mL water) was added, and the polycondensation was allowed to proceed for an additional four hours. At this point, p-t-butyl phenol (0.62 g, 2 mol %) in dichloromethane (10 mL) was added. After 20 minutes, the organic phase containing the polymer was washed free of salts by repeated water extractions. The polymer solution was then precipitated into a 10 volume excess of isopropanol, and the precipitated polymer was isolated by filtration. After air drying, the polymer was dissolved in DCM (10% solution) and reprecipitated from isopropanol. The material was then dried in a vacuum oven at 120° C.

The yield of final polymer was 78 g with $\eta_{sp}/C=0.99$ dL/g (C=0.5, $CH_2Cl_2$). The $T_g$ was 200° C. and the TGA showed major decomposition in a single step above 400° C. The ratio of total bisphenols to terephthalate was 2.05:1 by IR spectroscopy. The mole fraction of TMDCB to total bisphenols was estimated by NMR spectroscopy as 0.6.

EXAMPLE 12

Melt Viscosity Measurements

Polymer samples from Example 8 were tested for melt viscosity at 315° and 340° C. by the procedures of ASTM D-1238-73, Procedure A Manual.

The melt flow values in g/10 min were determined for the polymer of Example 8 and two comparison polymers, a polycarbonate and a poly(ester carbonate) having only bisphenol A as the dihydric aromatic alcohol. Values were taken at 315° C. and 340° C. and using 6590 g and 12500 g loads, with most measurements taken 2 or 3 times. The results, using an average where multiple runs were made, are displayed in Table III.

TABLE III

| | Soln. Visc. | 315° | | 340° C. | |
| --- | --- | --- | --- | --- | --- |
| | | 6590 g | 12500 g | 6590 g | 12500 g |
| Polycarbonate | 0.64 | 17.9 | 32.6 | 49.3 | 96.4 |
| Poly(ester carbonate) | 0.86 | 4.1 | 7.5 | 10.5 | 23.2 |
| Example 8 | 1.3 | 0.22 | 0.48 | 1.5 | 2.8 |

Truly comparable melt flows should be performed on materials with similar molecular weights or solution viscosities.

EXAMPLE 13

In like manner to Example 6, polymer is prepared from the following three materials:

| | | | |
| --- | --- | --- | --- |
| (a) | bisphenol-A | 22.83 g | 0.1 mol |
| | pyridine | 28 mL | 0.35 mol |
| | DCM | 283 mL | |
| (b) | TPC | 11.17 g | 0.055 mole |
| | DCM | 112 mL | |
| (c) | F* | 3.89 g | 0.0111 mol |
| | pyridine | 12 mL | 0.15 mol |

*9,9-bis(4-hydroxyphenyl) fluorene prepared by condensing phenol and fluorenone.

The components of (a) are charged to a flask equipped with a mechanical stirrer, gas inlet tube, dry-ice condenser and water bath. To this solution under inert gas flow (nitrogen) is added the solution (b). After a reaction time of ten minutes at 25° C., the solution (c) is added and at this time phosgene gas is admitted to the gas inlet and the reaction allowed to proceed until slightly more than the theoretical amount of phosgene has been added (0.06 mol). The viscous polymer solution is then treated with 10 mL of methanol to esterify excess phosgene, filtered to remove pyridine hydrochloride and precipitated into a suitable non-solvent such as isopropanol. The crude polymer is filtered, washed with water nt 80° C., and dried. The material is further purified by dissolution in DCM and reprecipitated in the non-solvent followed by water washing and vacuum drying at 120°-150° C.

In like manner, polymers are prepared substituting for F, 0.0111 moles of bisphenols formed from the following:
  indanone
  tetralone
  norbornanone
  cournanone
  anthrone
  anthraquinone
  xanthone
  phthalimide
  sulfobenzoic acid cyclic anhydride.

In like manner to Example 5, polymers are prepared substituting for phenolphthalein 0.08 moles of bisphenols derived from the following:
  cyclopentanone
  cyclohexanone
  caprolactam
  caprolactone.

What is claimed is:

1. A poly(ester carbonate) consisting essentially of about equimolar amounts of moieties derived from aromatic diols and a combination of carbonate moieties and aromatic or cycloalphatic diacyl moieties, with at least about 5 mol percent of the moieties derived from aromatic diols being a bisphenoxy moiety having the 4-carbon of each of two phenoxies covalently bonded to the same ring carbon of a carbocyclic of heterocyclic moiety, said carbocyclic or heterocyclic moiety having 5 to 14 cyclic atoms in 1 to 3 rings and being inert under polymerization reaction conditions.

2. The poly(ester carbonate) of claim 1 wherein the moieties derived from aromatic diols comprise about 5 to about 35 mol percent moieties derived from phenolphthalein and about 70 to about 95 mol percent moieties derived from bisphenol-A.

3. The poly(ester carbonate) of claim 1 or claim 2 wherein the aromatic or cycloaliphatic diacyl moieties are selected from the group consisting of terephthaloyl moieties, isophthaloyl moieties and mixtures thereof.

4. The poly(ester carbonate) of claim 1 or claim 2 wherein the aromatic or cycloaliphatic diacyl moieties are terephthaloyl.

5. The poly(ester carbonate) of claim 4 wherein the moieties derived from aromatic diols comprise between about 10 and about 25 mol percent moieties derived from phenolphthalein and about 75 to about 90 mol percent moieties derived from bisphenol-A.

6. The poly(ester-carbonate) of claim 1 wherein said bisphenoxy moiety is derived from the condensation of phenol with a carboxyl-containing compound selected from the group consisting of phthalic anhydride, cyclohexanone, fluorenone, indanone, tetralone, and mixtures thereof.

* * * * *